(12) United States Patent
Kondo (10) Patent No.: US 10,830,711 B2
(45) Date of Patent: Nov. 10, 2020

(54) X-RAY INSPECTION APPARATUS

(71) Applicant: ISHIDA CO., LTD., Kyoto (JP)

(72) Inventor: Shingo Kondo, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 3 days.

(21) Appl. No.: 16/356,903

(22) Filed: Mar. 18, 2019

(65) Prior Publication Data

US 2019/0297717 A1    Sep. 26, 2019

(30) Foreign Application Priority Data

Mar. 20, 2018  (JP) ................ 2018-053046

(51) Int. Cl.
| | | |
|---|---|---|
| *G01N 23/04* | (2018.01) | |
| *H05G 1/02* | (2006.01) | |
| *G01T 7/00* | (2006.01) | |
| *G01V 5/00* | (2006.01) | |

(52) U.S. Cl.
CPC ............. *G01N 23/04* (2013.01); *H05G 1/025* (2013.01); *G01T 7/00* (2013.01); *G01V 5/0016* (2013.01)

(58) Field of Classification Search
None
See application file for complete search history.

(56) References Cited

U.S. PATENT DOCUMENTS

| | | | | |
|---|---|---|---|---|
| 6,669,366 B2* | 12/2003 | Busse | ................ | A61B 6/035 378/199 |
| 7,261,466 B2* | 8/2007 | Bhatt | ................ | G01N 23/046 378/199 |
| 7,450,686 B2* | 11/2008 | Ainsworth | ........... | G01N 23/083 378/57 |
| 7,510,324 B2* | 3/2009 | Bhatt | ................ | G01N 23/046 378/199 |
| 7,626,173 B2* | 12/2009 | Hackenschmied | ....... | G01T 7/00 250/363.08 |
| 7,916,836 B2* | 3/2011 | Tkaczyk | ................ | G01T 1/24 250/370.09 |
| 9,865,424 B2* | 1/2018 | Ikeda | ................ | G01V 5/0016 |
| 10,292,251 B2* | 5/2019 | Kikuchi | ................ | H05G 1/025 |
| 2004/0202287 A1 | 10/2004 | Muller | | |
| 2007/0009084 A1* | 1/2007 | Bhatt | ................ | G01N 23/046 378/57 |
| 2007/0278412 A1* | 12/2007 | Hackenschmied | ... | G01T 1/2985 250/363.08 |
| 2007/0284535 A1 | 12/2007 | Heismann et al. | | |

(Continued)

FOREIGN PATENT DOCUMENTS

| | | |
|---|---|---|
| JP | 2001-318062 A | 11/2001 |
| JP | 2002-006049 A | 1/2002 |
| JP | 2015-192803 A | 11/2015 |

OTHER PUBLICATIONS

The extended European search report dated Aug. 5, 2019.

*Primary Examiner* — Thomas R Artman (74) *Attorney, Agent, or Firm* — Global IP Counselors, LLP (57) ABSTRACT

An X-ray inspection apparatus includes: an X-ray emitter configured to emit an X-ray; an X-ray detector configured to detect the X-ray; a first flow passage configured to guide air to at least part of the X-ray detector; and a second flow passage configured to guide air to at least part of the X-ray detector.

20 Claims, 5 Drawing Sheets

(56) References Cited

U.S. PATENT DOCUMENTS

| | | | |
|---|---|---|---|
| 2008/0118026 A1* | 5/2008 | Ainsworth | G01N 33/02 378/20 |
| 2008/0170670 A1* | 7/2008 | Bhatt | G01N 23/046 378/200 |
| 2015/0179391 A1* | 6/2015 | Ikeda | H01J 35/025 378/68 |
| 2017/0171953 A1* | 6/2017 | Kikuchi | H05G 1/025 |
| 2019/0297717 A1* | 9/2019 | Kondo | H05G 1/025 |

* cited by examiner

X-RAY INSPECTION APPARATUS

TECHNICAL FIELD

The present disclosure relates to an X-ray inspection apparatus.

BACKGROUND

As a conventional X-ray inspection apparatus, a device described in Japanese Unexamined Patent Publication No. 2001-318062, for example, is known. The X-ray inspection apparatus described in Japanese Unexamined Patent Publication No. 2001-318062 includes: a ventilation channel for guiding heat generated from an X-ray emitter (X-ray generator) to outside; a board forming part of the ventilation channel and sealing the X-ray emitter; and a cooling fin provided so as to penetrate the board and configured to transmit heat generated in the X-ray emitter to the ventilation channel. In the X-ray inspection apparatus described in Japanese Unexamined Patent Publication No. 2001-318062, the X-ray emitter can be cooled.

SUMMARY

The X-ray inspection apparatus includes an X-ray detector such as a line sensor configured to detect an X-ray emitted by the X-ray emitter. In such an X-ray detector, problems such as increased noises under the influence of heat, for example, may occur, which may lead to deterioration of detection accuracy. Thus, the temperature of the X-ray detector is preferably maintained as constant as possible. In the conventional X-ray inspection apparatus described above, the X-ray emitter can be cooled, but temperature change in the X-ray detector cannot be suppressed.

In view of this, it is an object of one aspect of the present disclosure to provide an X-ray inspection apparatus that can suppress temperature change in the X-ray detector.

An X-ray inspection apparatus according to the aspect of the present disclosure includes: an X-ray emitter configured to emit an X-ray; an X-ray detector configured to detect the X-ray; and an air-guiding unit configured to guide air to at least part of the X-ray detector.

In the X-ray inspection apparatus thus configured, the X-ray detector can be cooled and warmed with air guided by the air-guiding unit. Thus, temperature change in the X-ray detector can be suppressed.

In the X-ray inspection apparatus according to the aspect of the present disclosure, the X-ray detector may have a plurality of sensors provided to correspond to a plurality of energy bands. In the X-ray inspection apparatus thus configured, for example, a transmission image that can be acquired with an X-ray in a relatively high energy band and a transmission image that can be acquired with an X-ray in a relatively low energy band can be obtained simultaneously.

In the X-ray inspection apparatus according to the aspect of the present disclosure, the X-ray detector may be formed integrally as a unit with a control board configured to control the X-ray detector, and the air-guiding unit may guide air to at least part of the unit. In the X-ray inspection apparatus thus configured, even when the control board in which a larger amount of heat is generated is formed integrally with the X-ray detector, temperature change in the X-ray detector can be suppressed.

In the X-ray inspection apparatus according to the aspect of the present disclosure, the air-guiding unit may include: a ventilation channel serving as a flow passage for the air; and at least one of a fan configured to draw the air into the ventilation channel and a fan configured to discharge the air from the ventilation channel. By this configuration, air can be guided to the X-ray detector more effectively.

In the X-ray inspection apparatus according to the aspect of the present disclosure, the ventilation channel and the at least one of the fans may be connected to each other with a seal member interposed therebetween. In the X-ray inspection apparatus thus configured, the ventilation channel and the fans can be connected to each other in an airtight manner, whereby air can be guided to the X-ray detector more effectively.

The X-ray inspection apparatus according to the aspect of the present disclosure may further include a cold-air blower configured to supply cold air to the ventilation channel, the ventilation channel may have a branching portion, and cold air supplied by the cold-air blower may be guided to the X-ray detector and the X-ray emitter through the branching portion. In the X-ray inspection apparatus thus configured, cold air can be supplied to the X-ray emitter. Thus, the cold-air blower can be used for cooling the X-ray emitter.

In the X-ray inspection apparatus according to the aspect of the present disclosure, one end of the ventilation channel from which air is discharged may be open toward an air inlet from which air is drawn in the cold-air blower. In the X-ray inspection apparatus thus configured, the X-ray detector can be cooled effectively between the cold-air blower and the ventilation channel.

According to the aspect of the present disclosure, temperature change in the X-ray detector can be suppressed.

DETAILED DESCRIPTION

Figure 1:
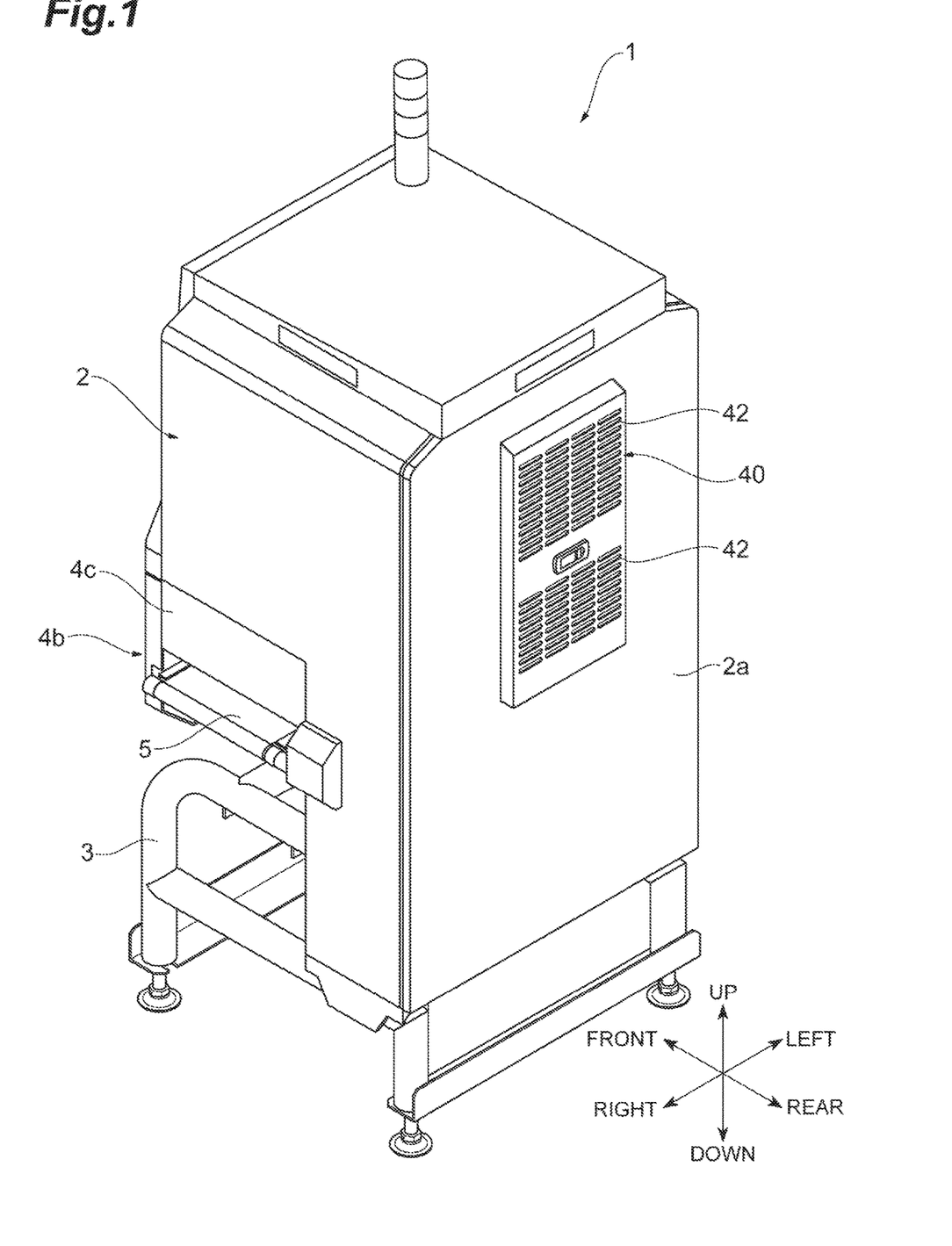
FIG. 1 is a perspective view illustrating an external appearance of an X-ray inspection apparatus according to one embodiment.
Figure 2:
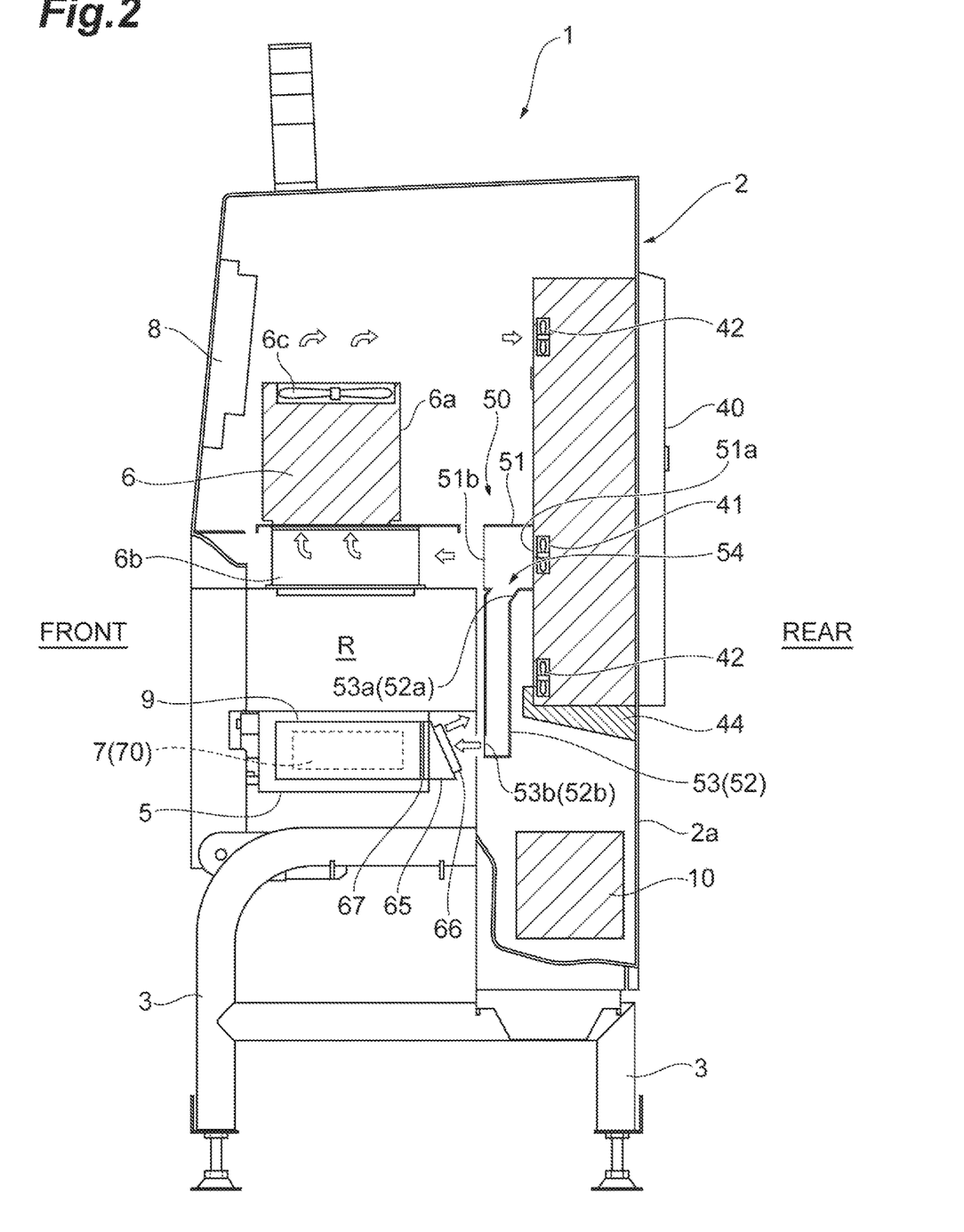
FIG. 2 is a sectional side view of the X-ray inspection apparatus in FIG. 1.
Figure 5:
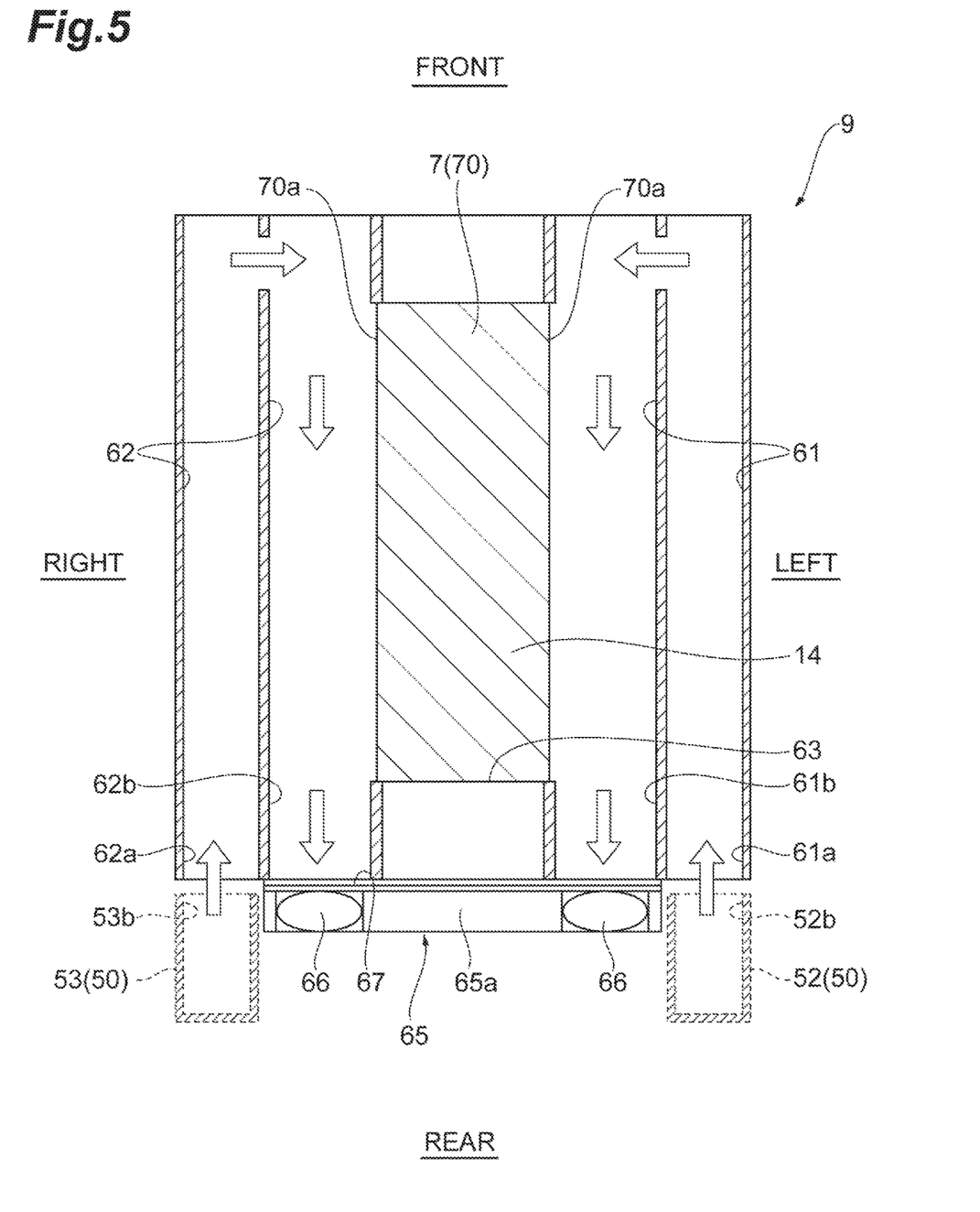
FIG. 5 is a sectional view illustrating ventilation channels disposed so as to face an X-ray detector depicted in FIG. 4.

A preferred embodiment of one aspect of the present disclosure will now be described in detail with reference to the attached drawings. In the description of the drawings, like or equivalent elements are designated by like numerals, and duplicate description is omitted. In FIG. 1, FIG. 2, and FIG. 5, the directions of "up", "down", "left", "right", "front", and "rear" are defined for convenience of description. However, the embodiment is not limited to these directions.

As depicted in FIG. 1 to FIG. 4, an X-ray inspection apparatus 1 includes a housing 2, support legs 3, a conveyance unit 5, an X-ray emitter 6, an X-ray detector 7, a display-operation unit 8, and a controller 10. The X-ray inspection apparatus 1 generates an X-ray transmission image of an article G while conveying the article G, and performs inspection (e.g., examination of the number of accommodated articles, foreign-matter contamination check, missing part check, chipping and cracking check) of the article G on the basis of the X-ray transmission image.

An article G before the inspection is carried into the X-ray inspection apparatus 1 by a carry-in conveyor (not depicted). An article G after the inspection is carried out from the X-ray inspection apparatus 1 by a carry-out conveyor (not depicted). An article G that has been determined to be a defective product by the X-ray inspection apparatus 1 is sorted outside a production line by a sorting device (not depicted) disposed downstream of the carry-out conveyor. An article G that has been determined to be a conforming product by the X-ray inspection apparatus 1 passes through the sorting device without being processed.

The housing 2 accommodates the conveyance unit 5, the X-ray emitter 6, the X-ray detector 7, and the controller 10. The housing 2 is formed of stainless steel that blocks X-rays, and prevents X-rays from leaking outside. Inside the housing 2, an inspection area R where an article G is inspected with an X-ray is provided. In the housing 2, a carry-in port 4a through which an article G is conveyed into the inspection area R and a carry-out port 4b through which the article G is carried out from the inspection area R are formed. An article G before the inspection is carried from the carry-in conveyor into the inspection area R through the carry-in port 4a. An article G after the inspection is carried out from the inspection area R to the carry-out conveyor through the carry-out port 4b. The carry-in port 4a and the carry-out port 4b are each provided with an X-ray blocking curtain 4c for preventing X-rays from leaking.

The support legs 3 support the housing 2. The conveyance unit 5 conveys an article G along a conveying direction A from the carry-in port 4a to the carry-out port 4b via the inspection area R. The conveyance unit 5 is, for example, a belt conveyor that runs between the carry-in port 4a and the carry-out port 4b.

The X-ray emitter 6 emits an X-ray onto the article G conveyed by the conveyance unit 5. The X-ray emitter 6 includes an X-ray tube (not depicted) configured to emit the X-ray, an accommodation unit 6a in which the X-ray tube is immersed in insulating cooling oil, and a collimator 6b disposed below the accommodation unit 6a and configured to widen the X-ray emitted from the X-ray tube in a fan shape in a plane perpendicular to the conveying direction A. On outer peripheral surfaces of the accommodation unit 6a, cooling fins (not depicted) vertically extending are formed. On an upper surface of the accommodation unit 6a, a fan 6c configured to form an air passage upward from below the accommodation unit 6a is provided.

The X-ray detector 7 includes a first line sensor 11 and a second line sensor 12. The first line sensor 11 and the second line sensor 12 each include X-ray detecting elements that are arranged linearly along a horizontal direction perpendicular to the conveying direction A. The first line sensor 11 detects an X-ray, in a low-energy band, that has been transmitted through an article G and a conveyance belt of the conveyance unit 5. The second line sensor 12 detects an X-ray, in a high-energy band, that has been transmitted through the article G, the conveyance belt of the conveyance unit 5, and the first line sensor 11.

The X-ray detector 7 includes the first line sensor 11 and the second line sensor 12. In the present embodiment, the X-ray detector is configured as an X-ray detection unit 70 in which a control board 14 is added to the first line sensor 11 and the second line sensor 12. The X-ray detection unit 70 is accommodated in an accommodation unit 9. The accommodation unit 9 is a housing that covers the X-ray detector 7 from the upper, lower, front, rear, right, and left directions. In an upper surface of the accommodation unit 9, a slit through which an X-ray emitted from the X-ray emitter 6 passes is formed.

As depicted in FIG. 5, the accommodation unit 9 includes a first flow passage (ventilation channel) 61, a second flow passage (ventilation channel) 62, and a disposition portion 63. The first flow passage 61 is disposed so as to face at least part 70a of the X-ray detection unit 70, and extends from one end 61a thereof to the other end 61b thereof. In the present embodiment, the one end 61a and the other end 61b are open toward a door 2a (see FIG. 2) that is closed. The first flow passage 61 is formed in a U-shape in plan view when viewed from the vertical direction. Similarly to the first flow passage 61, the second flow passage 62 is disposed so as to face at least part 70a of the X-ray detection unit 70, and extends from one end 62a thereof to the other end 62b thereof. In the present embodiment, the one end 62a and the other end 62b are open toward the door 2a that is closed. The second flow passage 62 is formed in a U-shape in plan view when viewed from the vertical direction. The disposition portion 63 is a portion on which the X-ray detection unit 70 is disposed.

At the other end 61b of the first flow passage 61 and the other end 62b of the second flow passage 62, a bracket 65 supporting discharge fans 66 and 66 is provided. The other end 61b of the first flow passage 61 and the other end 62b of the second flow passage 62 are connected to the bracket 65 with a gasket (seal member) 67 interposed therebetween. Alternatively, the other end 61b of the first flow passage 61 and the other end 62b of the second flow passage 62 may be connected to the bracket 65 by welding, for example. The bracket 65 is formed such that a surface 65a thereof to which the discharge fans 66 and 66 are attached is orthogonal to an obliquely rearward and upward direction. In other words, the other end 61b of the first flow passage 61 and the other end 62b of the second flow passage 62 are open so as to be orthogonal to the obliquely rearward and upward direction. When viewed from the discharge fans 66 and 66, in the obliquely rearward and upward direction, air inlets 42 of a cold-air blower 40 are positioned.

As depicted in FIG. 2, the display-operation unit 8 is provided to the housing 2. The display-operation unit 8 displays various types of information and receives inputs for various conditions. The display-operation unit 8 is a liquid crystal display, for example, and displays an operation screen as a touch panel. In this case, an operator can input various conditions with the display-operation unit 8.

Figure 3:
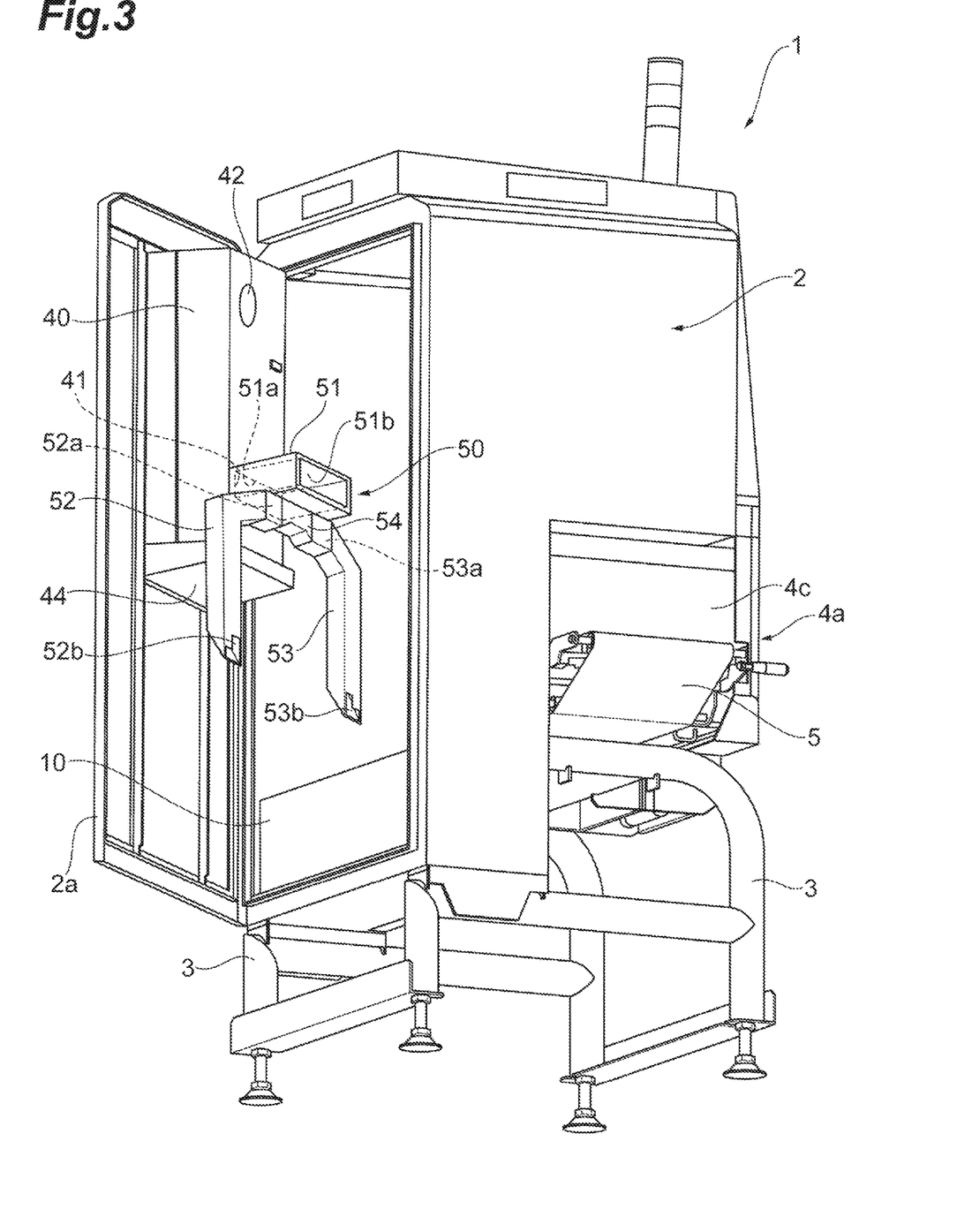
FIG. 3 is a perspective view of the X-ray inspection apparatus in FIG. 1 when a back door thereof is open.
Figure 4:
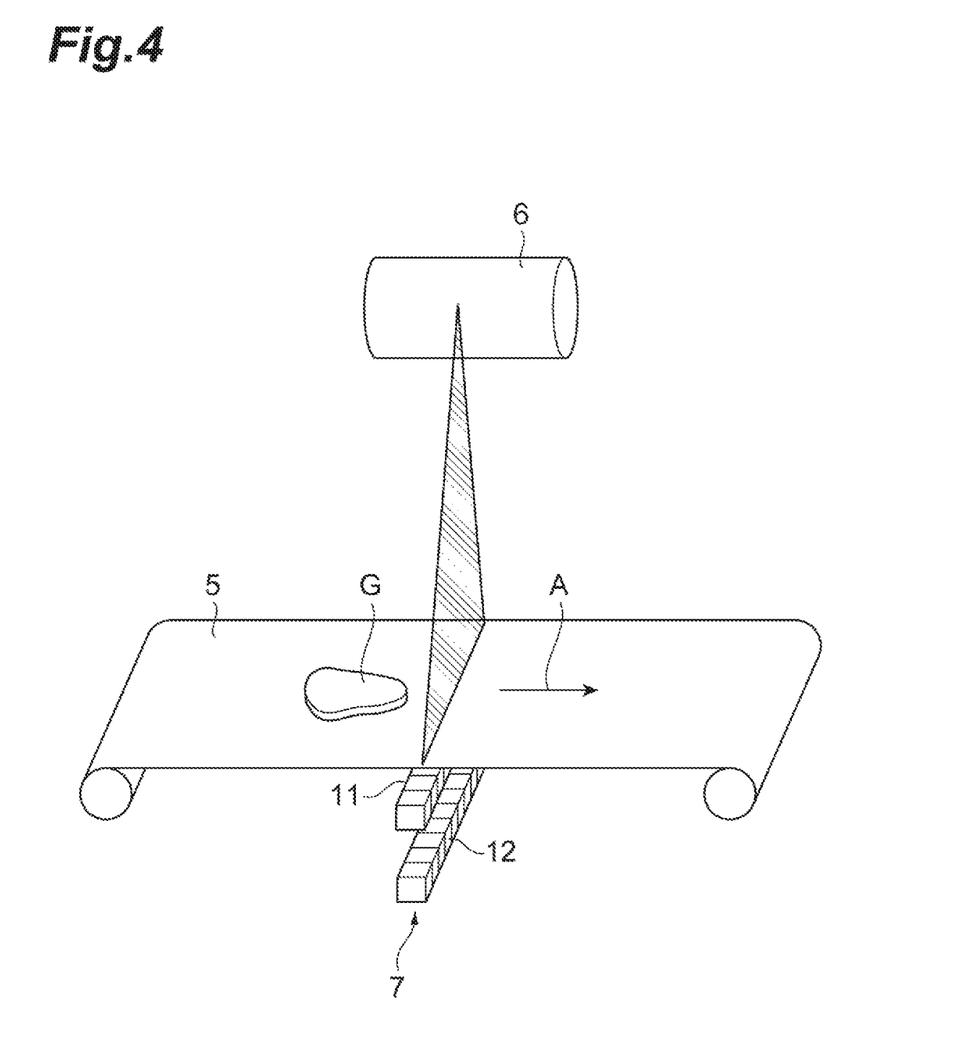
FIG. 4 is a perspective view illustrating inside of a housing of the X-ray inspection apparatus in FIG. 1.

As depicted in FIG. 2 and FIG. 3, the controller 10 is disposed inside the housing 2. The controller 10 controls operation of each component of the X-ray inspection apparatus 1. The controller 10 includes a central processing unit (CPU), a read only memory (ROM), and a random access memory (RAM). To the controller 10, a detection result of an X-ray in the low-energy band is input from the first line sensor 11 (see FIG. 4) of the X-ray detector 7, and also a detection result of an X-ray in the high-energy band is input from the second line sensor 12 (see FIG. 4) of the X-ray detector 7. Based on the detection result of the X-ray in the low-energy band and the detection result of the X-ray in the high-energy band, the controller 10 functions as a processing unit configured to determine whether foreign matter is contained in the article G.

As depicted in FIG. 1 to FIG. 3, on a rear side of the X-ray inspection apparatus 1, the cold-air blower 40 is disposed. The cold-air blower 40 draws air inside the housing 2 and outside the housing 2 from the air inlets 42, exchanges heat of the drawn air with a heat exchanger (not depicted), and supplies the air (cold air) cooled by this heat exchange from a supply port 41 into the housing 2 through a duct (ventilation channel) 50. In the present embodiment, the cold-air blower 40 is attached to the door 2a with which the housing 2 can be opened and closed. The door 2a is provided with a bracket 44 supporting a lower end of the cold-air blower 40.

The duct 50 includes: a first duct 51 extending in a front-and-rear direction when the door 2a is closed; and two branch ducts 52 and 53 into which the first duct 51 branches off via a branching portion 54 and that vertically extend. The first duct 51 has openings on one end 51a thereof and the other end 51b thereof, and between the one end 51a and the other end 51b, the branching portion 54 branching into the branch duct 52 and the branch duct 53 is provided. The one end 51a of the first duct 51 is connected to the supply port 41. The other end 51b of the first duct 51 is open forward when the door 2a is closed. In other words, when the door 2a is closed, the other end 51b is open toward a space in which the collimator 6b is disposed below the accommodation unit 6a.

The branch duct 52 has openings on one end 52a thereof and the other end 52b thereof. The one end 52a of the branch duct 52 is connected to the branching portion 54. The other end 52b of the branch duct 52 is positioned so as to face and be close to the one end 61a of the first flow passage 61 when the door 2a is closed (see FIG. 5). The branch duct 53 has openings on one end 53a thereof and the other end 53b thereof. The one end 53a of the branch duct 53 is connected to the branching portion 54. The other end 53b of the branch duct 53 is positioned so as to face and be close to the one end 62a of the second flow passage 62 when the door 2a is closed (see FIG. 5).

The following describes flows of cold air supplied by the cold-air blower 40. In the present embodiment, an air-guiding unit configured to guide air to at least part of the X-ray detector 7 includes the cold-air blower 40, the first flow passage 61, the second flow passage 62, and the discharge fans 66 described above. As depicted in FIG. 2 and FIG. 3, cold air supplied by the cold-air blower 40 is supplied from the supply port 41 of the cold-air blower 40 into the first duct 51. The cold air supplied to the first duct 51 flows through the branching portion 54 into the branch duct 52 and the branch duct 53. The cold air flowing into the branch duct 52 is discharged from the other end 52b of the branch duct 52. The cold air flowing into the branch duct 53 is discharged from the other end 53b of the branch duct 53.

As depicted in FIG. 5, when the door 2a is closed, the cold air discharged from the other end 52b of the branch duct 52 flows into the first flow passage 61 from the one end 61a of the first flow passage 61. The cold air flowing into the first flow passage 61 flows forward from the rear side of the accommodation unit 9, and then flows rearward from the front side thereof as indicated by arrows in FIG. 5. The cold air flowing through the first flow passage 61 facing part of the X-ray detection unit 70 takes heat away from the X-ray detection unit 70. The air the temperature of which has increased (warm air) is discharged from the other end 61b of the first flow passage 61 by the corresponding discharge fan 66. The warm air discharged from the discharge fan 66 is discharged toward the air inlets 42 of the cold-air blower 40 as depicted in FIG. 2. Thus, the warm air is drawn from the air inlets 42 of the cold-air blower 40, and is then supplied as cold air again from the supply port 41.

As depicted in FIG. 5, the cold air discharged from the other end 53b of the branch duct 53 flows into the second flow passage 62 from the one end 62a of the second flow passage 62. The cold air flowing into the second flow passage 62 flows forward from the rear side of the accommodation unit 9, and then flows rearward from the front side thereof as indicated by arrows in FIG. 5. The cold air flowing through the second flow passage 62 facing part of the X-ray detection unit 70 takes heat away from the X-ray detection unit 70. The air the temperature of which has increased (warm air) is discharged from the other end 62b of the second flow passage 62 by the corresponding discharge fan 66. The warm air discharged from the discharge fan 66 is discharged toward the air inlets 42 of the cold-air blower 40 as depicted in FIG. 2. Thus, the warm air is drawn from the air inlets 42 of the cold-air blower 40, and is then supplied as cold air again from the supply port 41.

As indicated by arrows in FIG. 2, the cold air discharged from the other end 51b of the first duct 51 is discharged toward the space in which the collimator 6b is disposed below the accommodation unit 6a. The cold air discharged toward the space in which the collimator 6b is disposed is guided (the flow is guided) upward by the fan 6c. At this time, the air is guided along the cooling fins formed on the outer peripheral surfaces of the accommodation unit 6a, whereby heat is taken away from the cooling fins. The air the temperature of which has increased is guided toward the air inlets 42 of the cold-air blower 40 by the fan 6c. Thus, the air is drawn from the air inlets 42 of the cold-air blower 40, and is then supplied as cold air again from the supply port 41.

In the X-ray inspection apparatus 1 of the embodiment, as depicted in FIG. 5, by air guided through the first flow passage 61 and the second flow passage 62, the first line sensor 11 and the second line sensor 12 can be cooled. Thus, temperature change in the first line sensor 11 and the second line sensor 12 can be suppressed.

In the X-ray inspection apparatus 1 of the embodiment, as depicted in FIG. 5, because the X-ray detection unit 70 faces the first flow passage 61 (second flow passage 62) extending from the one end 61a (one end 62a) to the other end 61b (the other end 62b), heat (warm air) generated in the X-ray detection unit 70 can be guided outside the accommodation unit 9, or cold air can be guided from the outside of the accommodation unit 9 into the X-ray detection unit 70. Consequently, temperature change in the X-ray detection unit 70 can be suppressed.

In the X-ray inspection apparatus 1 of the embodiment, the X-ray detection unit 70 includes sensors (the first line sensor 11 and the second line sensor 12) configured to detect correspond to X-rays in a plurality of energy bands. In the X-ray inspection apparatus 1 thus configured, for example, a transmission image that can be acquired with an X-ray in a relatively high energy band and a transmission image that can be acquired with an X-ray in a relatively low energy band can be obtained simultaneously. Thus, accuracy in detecting foreign matter, for example, can be increased. Furthermore, even if the X-ray inspection apparatus includes sensors configured to detect X-rays in a plurality of energy bands in which these sensors generate a larger amount of heat than common sensors do, temperature change in the X-ray detection unit 70 can be suppressed.

In the X-ray inspection apparatus 1 of the embodiment, at the other end 61b of the first flow passage 61 and the other end 62b of the second flow passage 62, the discharge fans 66 and 66 configured to discharge air are provided. Thus, more effectively, heat generated in the X-ray detection unit 70 can be guided outside the accommodation unit 9, or cold air can be guided from the outside of the accommodation unit 9 into the X-ray detection unit 70.

In the X-ray inspection apparatus 1 of the embodiment, the other ends 61b and 62b of the first flow passage 61 and the second flow passage 62 and the bracket 65 on which the discharge fans 66 and 66 are arranged are connected to each other with the gasket 67 interposed therebetween. Thus, airtightness of the first flow passage 61 and the second flow passage 62 is enhanced, whereby, more effectively, heat generated in the X-ray detection unit 70 can be guided outside the accommodation unit 9, or cold air can be guided from the outside of the accommodation unit 9 into the X-ray detection unit 70.

In the X-ray inspection apparatus 1 of the embodiment, the X-ray detector 7 is configured as the X-ray detection unit 70 including the first line sensor 11 and the second line sensor 12 together with the control board 14, and the first flow passage 61 and the second flow passage 62 are disposed so as to face at least the parts 70a and 70a of the X-ray detection unit 70. In the X-ray inspection apparatus 1 thus configured, even when the control board 14 in which a larger amount of heat is generated is formed integrally with the first line sensor 11 and the second line sensor 12, temperature change in the first line sensor 11 and the second line sensor 12 can be suppressed.

The X-ray inspection apparatus 1 of the embodiment includes the cold-air blower 40 configured to supply cold air to the first flow passage 61 and the second flow passage 62, and thus the temperature of the X-ray detection unit 70 can be prevented from increasing.

In the X-ray inspection apparatus 1 of the embodiment, the duct 50 for supplying cold air to the X-ray detection unit 70 includes the branching portion 45 such that the cold air is guided also to the X-ray emitter 6. In the X-ray inspection apparatus 1 thus configured, the temperature of the X-ray emitter 6 can be prevented from increasing.

In the X-ray inspection apparatus 1 of the embodiment, the discharge fans 66 disposed at the other end 61b of the first flow passage 61 and the other end 62b of the second flow passage 62 are open toward the air inlets 42 from which air is drawn in the cold-air blower 40. In the X-ray inspection apparatus 1 thus configured, between the cold-air blower 40 and each of the first flow passage 61 and the second flow passage 62, the X-ray detection unit 70 can be effectively cooled.

In the foregoing, one embodiment has been described. However, one aspect of the present disclosure is not limited to the embodiment, and various modifications can be made without departing from the gist of the present disclosure.

In the embodiment, an example of what is called a dual energy sensor has been described in which the first line sensor 11 and the second line sensor 12 are included as the X-ray detector 7. However, an X-ray detector 7 including one line sensor may be used instead.

In the embodiment and the modification above, an example has been described in which the X-ray detector 7 is configured as the X-ray detection unit 70 that is integrally formed including the control board 14. However, sensors such as the first line sensor 11 and the second line sensor 12 and the control board 14 may be disposed at positions different from each other. In this case, a configuration for cooling the sensors such as the first line sensor 11 and the second line sensor 12 is indispensable, and cooling also the control board 14 is preferable.

In the embodiment and the modifications above, an example has been described in which the discharge fans 66 and 66 are disposed at the other end 61b of the first flow passage 61 and the other end 62b of the second flow passage 62. However, instead of or in addition to this configuration, intake fans may be disposed at the one end 61a of the first flow passage 61 and the one end 62a of the second flow passage 62.

In the embodiment and the modifications above, an example has been described in which the discharge fans 66 and 66 provided at the other end 61b of the first flow passage 61 and the other end 62b of the second flow passage 62 discharge warm air toward the cold-air blower 40. However, the discharge fans may be configured to discharge the warm air outside the housing 2.

In the embodiment and the modifications above, an example has been described in which cold air supplied by the single cold-air blower 40 is guided to both the X-ray emitter 6 and the X-ray detection unit 70. However, without providing the branching portion 45, for example, the cold-air blower 40 may be used in a dedicated manner for the X-ray detection unit 70. In this case, the branching portion 45, for example, does not have to be provided, and the cold-air blower 40 may supply cold air to the X-ray detection unit 70 through a duct, or may supply the cold air directly to the first flow passage 61 and the second flow passage 62.

In the embodiment and the modifications above, an example has been described in which the cold-air blower 40 is provided to the door 2a with which the inside of the housing 2 can be opened or closed. However, the cold-air blower may be disposed inside the housing 2. Alternatively, from the cold-air blower 40 disposed outside the housing 2, cold air may be supplied to the first flow passage 61 and the second flow passage 62 through a duct, for example.

In the embodiment and the modifications above, an example has been described in which the X-ray inspection apparatus includes the cold-air blower 40 to supply cold air to the first flow passage 61 and the second flow passage 62 that face the X-ray detector 7. However, the X-ray inspection apparatus may include a heater, for example, instead of the cold-air blower 40, to supply warm air to the first flow passage 61 and the second flow passage 62. In this case, even when the X-ray inspection apparatus is used in a place such as outdoors where the temperature is low, cold air near the X-ray detector 7 can be guided to outside, or warm air (heat) can be guided from outside to the X-ray detector 7. Consequently, temperature change in the X-ray detector 7 can be suppressed.

In the embodiment and the modifications above, an example has been described in which the X-ray inspection apparatus includes the cold-air blower 40 or the heater, for example, to supply cold air or warm air to the first flow passage 61 and the second flow passage 62. However, the X-ray inspection apparatus does not necessarily have to include the cold-air blower 40 and the heater, for example. If the first flow passage 61 and the second flow passage 62 are provided so as to face part of the X-ray detector 7, air circulates by natural convection, whereby temperature change in the X-ray detector 7 can be suppressed.

In the embodiment and the modifications above, an example has been described in which the first flow passage 61 and the second flow passage 62 are provided. However, without providing the first flow passage 61 and the second flow passage 62, the X-ray inspection apparatus may include only at least one of the cold-air blower 40 and a fan. Even in this case, wind is guided to the first line sensor 11 and the second line sensor 12 or the X-ray detection unit 70.

In the embodiment and the modifications above, an example has been described in which the first flow passage 61 and the second flow passage 62 are formed as depicted in FIG. 5. However, if a flow passage (ventilation channel) facing part of the X-ray detector 7 is used, the shape, arrangement, and wind directions thereof, for example, are not limited to particular ones.

What is claimed is:

1. An X-ray inspection apparatus comprising:
   a housing that defines an inspection area therein;
   an X-ray emitter installed at a first fixed location within the housing above the inspection area, the X-ray emitter being configured to emit an X-ray;
   an X-ray detector installed at a second fixed location within the housing below the inspection area, the X-ray detector being configured to detect the X-ray; and
   an air-guiding unit configured to guide air to at least part of the X-ray detector.

2. The X-ray inspection apparatus according to claim 1, wherein the X-ray detector has a plurality of sensors provided to correspond to a plurality of energy bands.

3. The X-ray inspection apparatus according to claim 2, wherein
   the X-ray detector is formed integrally as a unit with a control board configured to control the X-ray detector, and
   the air-guiding unit guides air to at least part of the unit.

4. The X-ray inspection apparatus according to claim 3, wherein
   the air-guiding unit includes:
   a ventilation channel serving as a flow passage for the air; and
   at least one of a fan configured to draw the air into the ventilation channel and a fan configured to discharge the air from the ventilation channel.

5. The X-ray inspection apparatus according to claim 4, further including a cold-air blower configured to supply cold air to the ventilation channel, wherein
   the ventilation channel has a branching portion, and
   cold air supplied by the cold-air blower is guided to the X-ray detector and the X-ray emitter through the branching portion.

6. The X-ray inspection apparatus according to claim 5, wherein one end of the ventilation channel from which air is discharged is open toward an air inlet from which air is drawn in the cold-air blower.

7. The X-ray inspection apparatus according to claim 2, wherein
   the air-guiding unit includes:
   a ventilation channel serving as a flow passage for the air; and
   at least one of a fan configured to draw the air into the ventilation channel and a fan configured to discharge the air from the ventilation channel.

8. The X-ray inspection apparatus according to claim 7, further including a cold-air blower configured to supply cold air to the ventilation channel, wherein
   the ventilation channel has a branching portion, and
   cold air supplied by the cold-air blower is guided to the X-ray detector and the X-ray emitter through the branching portion.

9. The X-ray inspection apparatus according to claim 8, wherein one end of the ventilation channel from which air is discharged is open toward an air inlet from which air is drawn in the cold-air blower.

10. The X-ray inspection apparatus according to claim 1, wherein
    the X-ray detector is formed integrally as a unit with a control board configured to control the X-ray detector, and
    the air-guiding unit guides air to at least part of the unit.

11. The X-ray inspection apparatus according to claim 10, wherein
    the air-guiding unit includes:
    a ventilation channel serving as a flow passage for the air; and
    at least one of a fan configured to draw the air into the ventilation channel and a fan configured to discharge the air from the ventilation channel.

12. The X-ray inspection apparatus according to claim 11, further including a cold-air blower configured to supply cold air to the ventilation channel, wherein
    the ventilation channel has a branching portion, and
    cold air supplied by the cold-air blower is guided to the X-ray detector and the X-ray emitter through the branching portion.

13. The X-ray inspection apparatus according to claim 12, wherein one end of the ventilation channel from which air is discharged is open toward an air inlet from which air is drawn in the cold-air blower.

14. The X-ray inspection apparatus according to claim 1, wherein
    the air-guiding unit includes:
    a ventilation channel serving as a flow passage for the air; and
    at least one of a fan configured to draw the air into the ventilation channel and a fan configured to discharge the air from the ventilation channel.

15. The X-ray inspection apparatus according to claim 14, wherein the ventilation channel and the at least one of the fans are connected to each other with a seal member interposed therebetween.

16. The X-ray inspection apparatus according to claim 15, further including a cold-air blower configured to supply cold air to the ventilation channel, wherein
    the ventilation channel has a branching portion, and
    cold air supplied by the cold-air blower is guided to the X-ray detector and the X-ray emitter through the branching portion.

17. The X-ray inspection apparatus according to claim 16, wherein one end of the ventilation channel from which air is discharged is open toward an air inlet from which air is drawn in the cold-air blower.

18. The X-ray inspection apparatus according to claim 14, further including a cold-air blower configured to supply cold air to the ventilation channel, wherein
    the ventilation channel has a branching portion, and
    cold air supplied by the cold-air blower is guided to the X-ray detector and the X-ray emitter through the branching portion.

19. The X-ray inspection apparatus according to claim 18, wherein one end of the ventilation channel from which air is discharged is open toward an air inlet from which air is drawn in the cold-air blower.

20. The X-ray inspection apparatus according to claim 1, wherein
    the air-guiding unit includes a horizontally extending duct and a vertically extending duct that extends downwardly from the horizontally extending duct.

* * * * *